United States Patent [19]
Antonini

[11] 4,426,094
[45] Jan. 17, 1984

[54] NON-METALLIC GUARD FOR SEALING LIPS

[75] Inventor: Joseph Antonini, Chicago, Ill.

[73] Assignee: Dana Corporation, Toledo, Ohio

[21] Appl. No.: 459,423

[22] Filed: Jan. 20, 1983

[51] Int. Cl.³ .............................................. F16J 15/32
[52] U.S. Cl. .................................... 277/153; 277/134;
                                                277/166; 277/50
[58] Field of Search ................ 277/152, 153, 134, 35,
                                                277/50, 166, 186

[56] References Cited

U.S. PATENT DOCUMENTS

| | | | |
|---|---|---|---|
| 2,367,411 | 1/1945 | Lillis | 277/35 |
| 2,493,255 | 1/1950 | Lillis | 277/35 |
| 2,709,098 | 5/1955 | Kosatka | 277/51 |
| 3,363,952 | 1/1968 | Peterson | 277/153 X |
| 3,494,682 | 2/1970 | Keller | 308/187.1 |
| 3,606,352 | 9/1971 | Lutz | 277/32 |
| 4,306,729 | 12/1981 | Hiramatsu et al. | 277/153 |

FOREIGN PATENT DOCUMENTS

| | | | |
|---|---|---|---|
| 876866 | 8/1942 | France | 277/153 |
| 1437899 | 3/1966 | France | 277/134 |
| 56-160465 | 10/1981 | Japan | 277/152 |
| 590874 | 7/1947 | United Kingdom | 277/152 |

*Primary Examiner*—Robert S. Ward
*Attorney, Agent, or Firm*—Frank B. McDonald

[57] ABSTRACT

An oil seal assembly 10 of the type including a structural metallic outer casing 12 includes a resilient guard 30 for protection of a sealing element 18 bonded to the structural casing. In a preferred form the guard is formed of a resilient, non-metallic inert material, preferably polypropylene, and is supported axially within the outer casing by mechanical interference. Also in the preferred form the sealing element includes both particulate and fluid shaft contact lips 20,22.

11 Claims, 2 Drawing Figures

NON-METALLIC GUARD FOR SEALING LIPS

BACKGROUND OF THE INVENTION

This invention relates generally to apparatus for sealing the annular interfaces between housings and relatively rotatable shafts extending from the housings. More particularly, the invention relates to protective members associated with sealing lips incorporated in such apparatus. Where external steel casings have been utilized for structural strength in seal assemblies, prior art has taught the molding and/or bonding of non-metallic members to the metallic structures for providing protective members or guards thereon. The guards provide mechanical protection of the particulate or fluid sealing lips associated with the sealing assemblies. The processes of molding and bonding not only involve extra manufacturing steps, but also involve added costs and handling of associated materials utilized in joining the non-metallic members to the metallic structures. In addition, prior art teachings of non-metallic guard members hve involved relatively inelastic materials of limited resilience, as, for example, either hard plastics or phenolic-resin impregnated fiber board.

Simpler and more efficient constructions of guard members are needed, wherein the materials thereof have greater resilience and are hence deformable and less subject to cracking. Simpler manufacturing techniques are also needed, wherein bonding of resilient materials to the metal structures is not required. The latter improved seal constructions and techniques would be particularly desirable for the mass production of seal assemblies involving non-metallic protective members.

SUMMARY OF THE INVENTION

The oil seal assembly as disclosed and described herein does not require the manufacturing steps normally associated with bonding or molding of the protective members utilized therein. Moreover, the seal assembly constructions herein utilize protective members which are more resilient than offered in prior art systems for protection of the sealing elements associated therewith. Thus the improved protective members of the present invention are not only more simply assembled to the structural members of the sealing apparatus, but also are not subject to cracking and breakage as have been prior art protective members.

In a preferred construction, an improved oil seal assembly includes a polypropylene guard mated with a structural metallic outer casing member, the guard protectively juxtaposed with the sealing element of the seal assembly. The guard is supported axially within the outer metallic structural member by resilient, snap-fittable mechanical interference between the two mated parts.

DETAILED DESCRIPTION OF PREFERRED EMBODIMENTS

Figure 1:
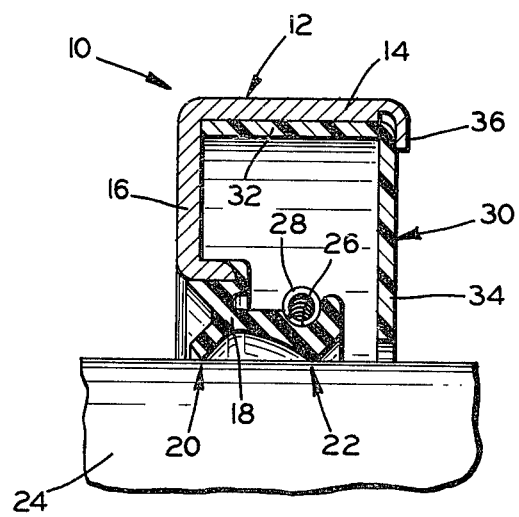
FIG. 1 is a cross section of a first preferred embodiment of a seal assembly having a construction in accordance with the present invention, wherein the seal is shown in contact with a shaft, the latter shown fragmentarily.

Referring now to FIG. 1, an oil seal assembly 10 is shown having a construction of the type which includes a structural metallic outer casing 12. The outer casing 12 includes axially and radially extending portions 14 and 16, respectively. The axially extending portion 14 provides a means for mounting the seal assembly 10 on one of a pair of relatively rotatable members, for example an engine housing (not shown). The radially extending portion 16 is structurally associated with an annular sealing member 18, and in the preferred embodiment as shown herein, is bonded thereto. The sealing member 18 defines a body of elastomeric material, which includes a pair of annular sealing lips 20 and 22. The lips 20 and 22 provide sealing association between the engine housing and the other of said pair of relatively rotatable members, as for example, a shaft 24.

In the embodiment of FIG. 1, the sealing lip 20 provides a seal against the passage of particulates, as for example dirt and other fine typically airborne solid matter which may exist in the operating environment of an engine, while the sealing lip 22 provides a fluid seal, as for example in the present case, an oil seal. An annular groove 26 about the external periphery of the sealing member 18 is positioned directly over the sealing lip 22, and provides a means for receiving a garter spring 28 which insures continuous contact of the annular sealing lip 22 with the shaft 24.

A non-structural resilient, elastically deformable inner casing 30 also includes axially and radially extending portions 32 and 34, respectively. The axially extending portion 32 of the inner casing 30 is telescopically inserted within the axially extending portion 14 of the outer casing 12. In the embodiment shown in FIG. 1, the axially extending portion 14 includes a radially inwardly formed annulus 36 which forms a snap-fittable retention system for the resilient inner casing 30.

The inner casing 30 provides a "guide" or centering means for installation of a pinion shaft in a vehicle. As the latter is normally a blind operation, the resilient, elastic nature of the casing prevents scouring of the shaft, as well as providing protection of the sealing member 18. The casing 30 is formed of a non-metallic, resilient material, which in the preferred embodiment is an inert material, preferably polypropylene. Thus it will be appreciated by those skilled in the art that the casing 30 is elastically deformable to permit resilient insertion beyond the annulus 36, wherein a mechanical interference contact between the annulus 36 and the inner casing 30 hold the inner and outer casings together. It will also be seen in the preferred embodiment of FIG. 1 that by virtue of the position of the radially inwardly extending portion 34 with respect to the fluid sealing lip 22 of the seal assembly, the inner casing 30 will provide a protective member for the lip 22.

Figure 2:
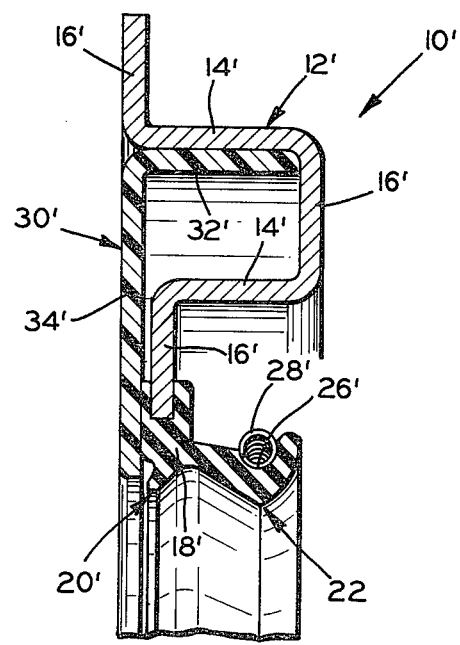
FIG. 2 is an alternate embodiment of a seal assembly constructed in accordance with the present invention, wherein the seal is not shown in association with a shaft member.

Referring now to FIG. 2, an alternate embodiment of an oil seal assembly 10' is shown, wherein an inner casing 30' is provided for protection of a particulate lip 20' of a sealing member 18'. Thus, this latter embodiment contemplates protection of the particulate lip wherein protection is not required at a fluid sealing lip 22' of the sealing member 18'. A structural outer casing 12' in the embodiment of FIG. 2 includes a plurality of axially extending portions 14' and radially extending portions 16'; however, these pluralities exist by reason of design configuration only. By contrast, the inner casing 30' contains a single axially extending portion 32' and a single radially extending portion 34', and is thus identical to the inner casing 30 of the embodiment of FIG. 1.

As to the manner of mechanical connection between the inner casing 30' and the outer casing 12', the embodiment of FIG. 2 provides for a press-fittable frictional contact between the axially extending portion 32' and matingly associated axially extending portion 14' of the outer casing 12. Obviously, the members must be radially sized for insuring a press-fittable frictional retentional system therebetween. Again however, the referred material of the casing 30' is polypropylene, which is elastically deformable as well as inert.

Finally, as in the embodiment of FIG. 1, the embodiment of FIG. 2 also includes a groove 26' which is disposed for receiving a garter spring member 28' for insuring resilient continuous contact of the oil seal lip 22' with an associated shaft (not shown).

What is claimed is:

1. In an oil seal assembly comprising a structural metallic outer casing, an inner casing contained within said outer casing, said outer casing including a radially inwardly extending portion having a sealing element bonded thereto, said inner casing including a radially inwardly extending portion juxtapositioned with said sealing element for protection of said element; an improvement comprising said inner casing:
   (a) formed of a non-metallic, resilient material, and
   (b) supported axially within said outer casing by non-bonded, mechanical means.

2. The oil seal assembly of claim 1 wherein said sealing element comprises a pair of flexible shaft contact lips, a first for sealing against fluids, and a second lip for sealing against particulates.

3. The oil seal assembly of claim 2 wherein said radially inwardly extending portion of said inner casing is positioned for protection of said first lip.

4. The oil seal assembly of claim 3 wherein said mechanical means comprises a mechanical interference, said interference created by an inwardly formed annulus on said outer casing, said annulus providing a snap-fittable retention means for said resilient inner casing.

5. The oil seal assembly of claim 4 wherein said non-metallic, resilient material of said inner casing comprises a polypropylene.

6. The oil seal assembly of claim 5, wherein said first sealing lip is externally grooved for receiving a garter spring, whereby resilient, continuous, shaft contact may be maintained by said first lip.

7. The oil seal assembly of claim 2 wherein said radially inwardly extending portion of said inner casing is positioned for protection of said second lip.

8. The oil seal assembly of claim 7 wherein said mechanical means comprises an axially extending radially inner annular surface on said outer casing and an axially extending radially outer annular surface of said resilient inner casing, said surfaces providing a press-fittable frictional retention system between said inner and outer casings.

9. The oil seal assembly of claim 5 wherein said non-metallic, resilient material of said inner casing comprises a polypropylene.

10. The oil seal assembly of claim 6 wherein said first sealing lip is externally grooved for receiving a garter spring, whereby resilient shaft contact may be maintained by said first lip.

11. An oil seal assembly comprising first and second casings, the first comprising a metallic outer cylindrical body portion disposed for being mounted to one of a pair of relatively rotatable members, the second comprising a non-metallic, resilient inner member retained by non-bonded, mechanical means to said outer casing, said first casing having a sealing element bonded thereto for sealing association with the other of said pair of relatively rotatable members, said second casing providing a resilient guard for protection of said sealing element.

* * * * *